United States Patent
Lazier

(10) Patent No.: US 9,378,075 B2
(45) Date of Patent: Jun. 28, 2016

(54) REDUCING INTERFERENCE THROUGH CONTROLLED DATA ACCESS

(71) Applicant: Amazon Technologies, Inc., Reno, NV (US)

(72) Inventor: Colin Laird Lazier, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 201 days.

(21) Appl. No.: 13/895,205

(22) Filed: May 15, 2013

(65) Prior Publication Data

US 2014/0344531 A1 Nov. 20, 2014

(51) Int. Cl.
| | |
|---|---|
| *G06F 12/16* | (2006.01) |
| *G06F 11/07* | (2006.01) |
| *G06F 11/10* | (2006.01) |
| *G06F 3/06* | (2006.01) |

(52) U.S. Cl.
CPC .......... *G06F 11/0727* (2013.01); *G06F 3/0689* (2013.01); *G06F 11/0751* (2013.01); *G06F 11/1076* (2013.01); *G06F 2211/1004* (2013.01); *G06F 2211/1028* (2013.01)

(58) Field of Classification Search
None
See application file for complete search history.

(56) References Cited

U.S. PATENT DOCUMENTS

| | | | | |
|---|---|---|---|---|
| 7,253,982 | B1* | 8/2007 | Brunnett et al. | 360/60 |
| 8,271,140 | B2* | 9/2012 | Cagno et al. | 700/280 |
| 8,370,312 | B1 | 2/2013 | Sawhney et al. | |
| 2006/0107131 | A1 | 5/2006 | Mills et al. | |
| 2007/0035880 | A1* | 2/2007 | Hall et al. | 360/137 |
| 2009/0089343 | A1 | 4/2009 | Moore et al. | |
| 2010/0023722 | A1 | 1/2010 | Tabbara et al. | |
| 2010/0049931 | A1 | 2/2010 | Jacobson et al. | |
| 2010/0274762 | A1 | 10/2010 | Murphy et al. | |
| 2010/0280998 | A1 | 11/2010 | Goebel et al. | |
| 2011/0043944 | A1* | 2/2011 | Elliott | 360/75 |
| 2012/0215977 | A1* | 8/2012 | Lin et al. | 711/112 |
| 2013/0013766 | A1 | 1/2013 | Britsch et al. | |
| 2014/0122795 | A1 | 5/2014 | Chambliss | |
| 2014/0229696 | A1 | 8/2014 | Feng et al. | |
| 2014/0254343 | A1* | 9/2014 | Miller et al. | 369/53.42 |
| 2014/0259023 | A1* | 9/2014 | Miller et al. | 718/105 |

FOREIGN PATENT DOCUMENTS

CN 103984607 8/2014

OTHER PUBLICATIONS

International Search Report and Written Opinion mailed Sep. 19, 2014, in International Patent Application No. PCT/US2014/037143, filed May 7, 2014.

\* cited by examiner

*Primary Examiner* — Kaushikkumar Patel
(74) *Attorney, Agent, or Firm* — Davis Wright Tremaine LLP

(57) ABSTRACT

A data storage service receives a request to perform an operation in a data storage system that consists of many data storage devices, each device having a corresponding set of devices that may cause interference. The data storage service determines a manner in which to perform the operation while evaluating the current activity state of the devices that may cause interference. The data storage service can perform the operation in the determined manner.

26 Claims, 12 Drawing Sheets

REDUCING INTERFERENCE THROUGH CONTROLLED DATA ACCESS

CROSS REFERENCE TO RELATED APPLICATIONS

This application is subject matter related to U.S. patent application Ser. No. 13/895,237, filed on May 15, 2013, entitled, "ALLOCATING DATA BASED ON HARDWARE FAULTS," the contents of which are incorporated by reference herein in its entirety.

BACKGROUND

Data storage systems have evolved and continue to evolve to keep up with the demands of organizations that use them. Many organizations, for example, utilize data storage systems for, among other reasons, the purpose of data archiving, redundancy, and storage of large amounts of data. Despite their many advantages, modern data storage systems contain inherent risks that are borne by the data storage system provider and the organizations that utilize them. For example, despite best efforts to avoid it, data storage systems often include components that can be susceptible to overheating and/or fatigue damage resulting from vibrations in the system caused by various moving parts, such as spinning magnetic media. Consequently, data that is contained in the data storage systems may be susceptible to corruption or loss. Adequately addressing these risks, such as through adequate redundant storage of data, presents additional costs to the organizations that rely on the data storage systems and to the service provider.

BRIEF DESCRIPTION OF THE DRAWINGS

Various embodiments in accordance with the present disclosure will be described with reference to the drawings, in which.

DETAILED DESCRIPTION

Figure 1:
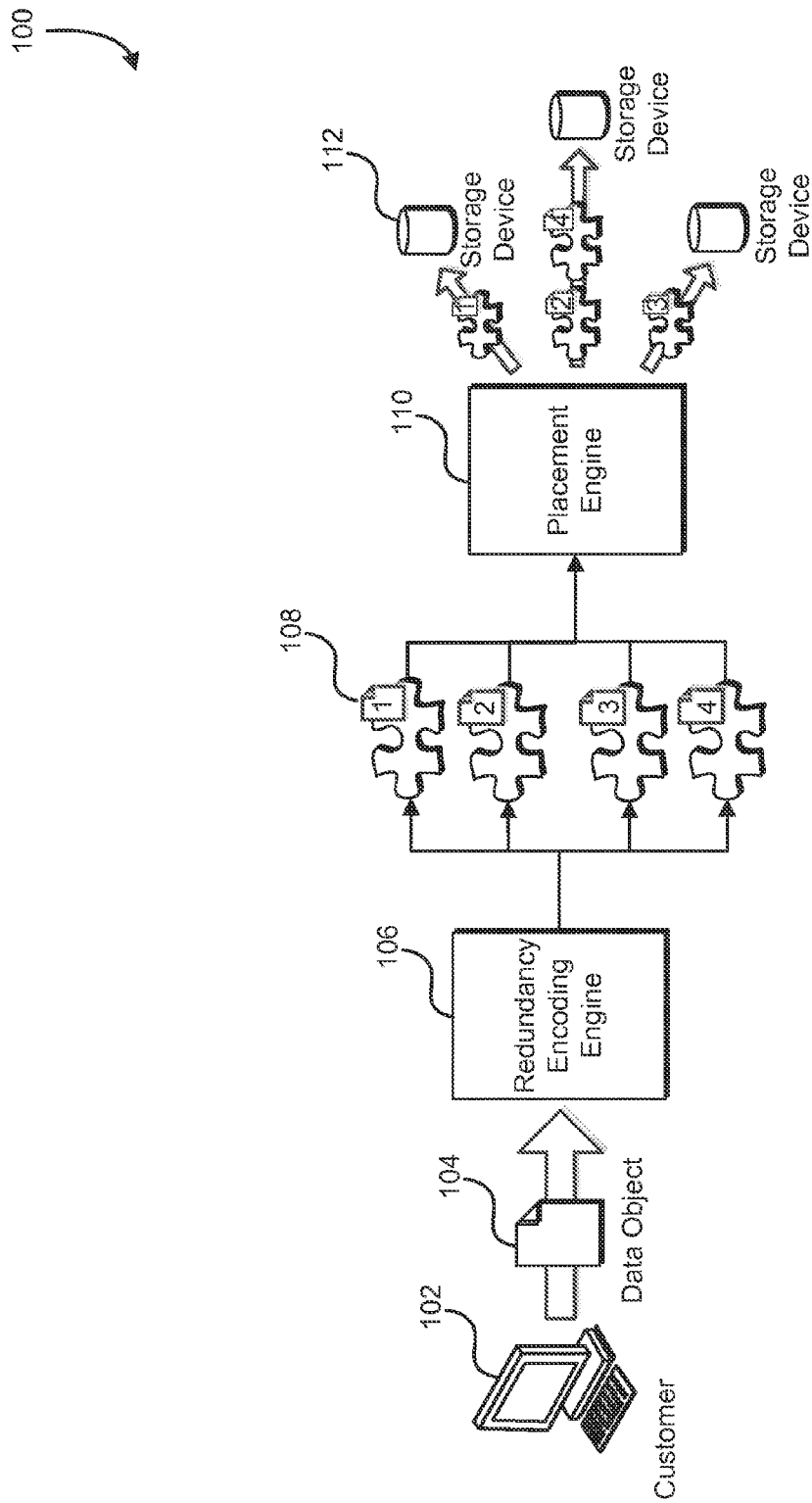
FIG. 1 shows an illustrative example of an environment in which various embodiments can be practiced.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the storage and access of data while minimizing the risk of data loss or corruption. In an embodiment, an entity (e.g., an organization) contacts the service, such as through appropriately configured application programming interface (API) calls to the service, to request archival of or access to a data object (e.g., retrieval of the data object). In an embodiment, the entity is a customer of a computing resource service provider that operates the data storage service. Upon receipt of the request, the service provider may receive the data object from the customer and, through the use of a redundancy encoding algorithm, convert the object into various fragments for storage in the system. The algorithm may be, for example, one in which the data object is divided into redundant fragments such that only a few fragments are needed to recompile the object. Example algorithms include those which utilize erasure codes to transform a sequence of bits to multiple sequences of bits that are collectively larger than the sequence of bits such that a proper subset of the multiple sequences of bits are suitable for reconstructing the sequence of bits.

In various embodiments, a data storage system is facilitated by using various network racks. These racks contain a variety of multiple storage device units, such as JBODs, that in turn may consist of a variety of storage devices, such as storage devices that utilize spinning magnetic media (e.g., platters), magnetic tape storage devices or solid state drives (SSD). These storage devices may be susceptible to failure due to the operational environment. For instance, in the case of storage devices that utilize spinning magnetic media, each storage device creates vibrations that may affect other storage devices in close proximity. This type of vibration may lead to a head crash (e.g., the read/write heads on the storage device arms come in contact with the rotating platters, physically damaging one or more platters) and data loss. Storage devices are also prone to overheating which may reduce the useful life of the storage device itself. A service provider may have information regarding the failure modes in the data storage system and, using this information, may attempt to mitigate the risk of damage and data loss. It is important to note that these failure modes are not necessarily modes that are known to cause failure but may be modes that, if they were to cause failure, would impair data durability. For example, a computer resource service provider may not have information to determine if there is a significant risk of data loss if data is written to the same platter in different storage devices, but the service provider may want to avoid this situation due to the potential damage resulting from a failure.

In various embodiments, the service provider determines placement of the fragments in the data storage system in a manner that will reduce the risk of data loss due to hardware failure. A placement may indicate a physical location in a data storage system. The physical location may be as specific as the service provider is able to control. For example, a placement may, for each fragment of a plurality of fragments, indicate or otherwise correspond to one or more physical characteristics of a location for the fragment such as a geographic region, a data center, data center room, rack, rack unit (e.g., multiple storage device unit within a rack) and/or storage device which the fragment is to be stored. In some embodiments, the service provider has even greater granular control over data placement and, as such, a placement may, for each fragment of a plurality of fragments, indicate or otherwise correspond to physical characteristics for a location such as a platter in a storage device with spinning magnetic media (platters), a side of a platter, an annular region on a platter, a location on a platter accessible by a particular head of a storage device and/or other physical locations. The service provider may have specific rules set forth in a placement engine that is configured to make placement decisions to mitigate such loss. For example, a service provider may use a hardware failure in the data storage system to update the rules incorporated into the placement engine to avoid repeating this and other failure modes.

In some examples, the placement engine receives a request to place fragments of the data object into the data storage system. After the placement engine has determined the location of the first fragment, the engine may select the data storage location of the next fragment based on a variety of rules set forth by the service provider in order to mitigate the risk of data loss. For example, if the selected location of a subsequent fragment does not satisfy the rules set forth in the engine, it will continue to re-select a location for that fragment until a proper location is identified. At that point, the placement engine will move on to the next fragment or, if there are no fragments left to analyze, place all the fragments into the data storage system.

In various circumstances, a data storage system may simultaneously process numerous requests from numerous customers or generally may access data storage devices for other reasons (e.g., garbage collection) during request processing. As a result, storage devices within the data storage system that store data that is at least partially responsive to a request may be operating when the request is made by a customer to either access or archive a data object. As stated above, a storage device can create vibrations and may be susceptible to overheating. Thus, in various embodiments, a service provider mitigates the risk of data loss by, for instance, preventing access to specific storage devices during the archival or retrieval process through the use of rules in the placement engine. For example, if the placement engine has established that a fragment is to be stored in a specific storage device but an adjacent storage device is in use, the engine may determine the location of any other fragments prior to placing the fragments in data storage. In the instance of data retrieval, the data storage system may perform a similar operation as noted above but instead may opt to obtain only the necessary fragments required to recompile the data object. In some embodiments, read, write and/or delete operations may be delayed until a state of the data storage system is such that the read, write and/or delete operations are permitted to be performed to lower the risk of failure. For example, if data is to be written to, read from or deleted from a particular storage device, writing, reading or deleting the data may be delayed until any adjacent storage devices are idle.

In this manner, data in a data storage system is less susceptible to loss due to hardware failures within the system. In addition, the techniques described and suggested herein facilitate additional technical advantages. For example, because, in some embodiments, access to certain storage devices may be restricted based on the operating environment at any given time, the hardware contained within the data storage system is less prone to fatigue damage and thus may reduce maintenance costs for the service provider. This, in turn, may lead to a reduction in cost for the customer. Additional uses are also enabled by the various techniques described herein.

FIG. 1 shows an illustrative example of an environment 100 in which various embodiments may be practiced. In the environment 100, a customer 102 transmits a data object 104 (e.g., this may include files composed of one or more bits such as, but not limited to, executable programs, drawings and text documents) to a computing resource service provider for storage in a data storage system. Customers and computing resource service providers may be organizational entities, such as corporations or other organizations. It should be noted that, while the present disclosure discusses customers communicating with computing resource service providers, unless otherwise clear from context, such communications may occur via devices (e.g., computer systems) operated by and/or on behalf of the organizations using one or more communication protocols, such as those noted below.

The data object 104 is processed through a redundancy encoding engine 106. The redundancy encoding engine 106 may utilize one or more algorithms to convert the data object provided by the customer 102 into numerous data fragments 108. The data storage system may maintain a database that associates an identifier of the parent data object 104 with the data storage locations of the data fragments 108. Additionally, the data fragments 108 may be encoded for tracking within the system. For example, a data fragment 108 may be encoded with the name of the parent data object 104 and the number of fragments required to recompile the data object at a later time.

Subsequently, as illustrated in FIG. 1, the data fragments 108 are processed through a placement engine 110 which determines the location for each data fragment 108 in the data storage system. A placement engine 110 may be a computer system or component of a computer system that is configured to apply a set of rules to place data fragments 108 into storage devices (e.g., drives) 112 in the data storage system. The placement engine 110 may use a variety of rules specified by the service provider to determine proper location. Once the location for each data fragment 108 has been specified, the data fragments 108 are transferred to corresponding storage devices 112 for storage.

The storage devices 112 may consist of spinning magnetic media, magnetic tape drives, SSD or any other form of data storage device. The data fragments 108 may reside in these storage devices 112 until such time the customer 102 provides a request to the service provider to modify the data object 104. For example, a customer 102 may request that the data object 104 be deleted, replaced or overwritten. In such an instance, the service provider would access the storage devices 112 containing the data fragments 108 and comply with the customer request.

Figure 2:
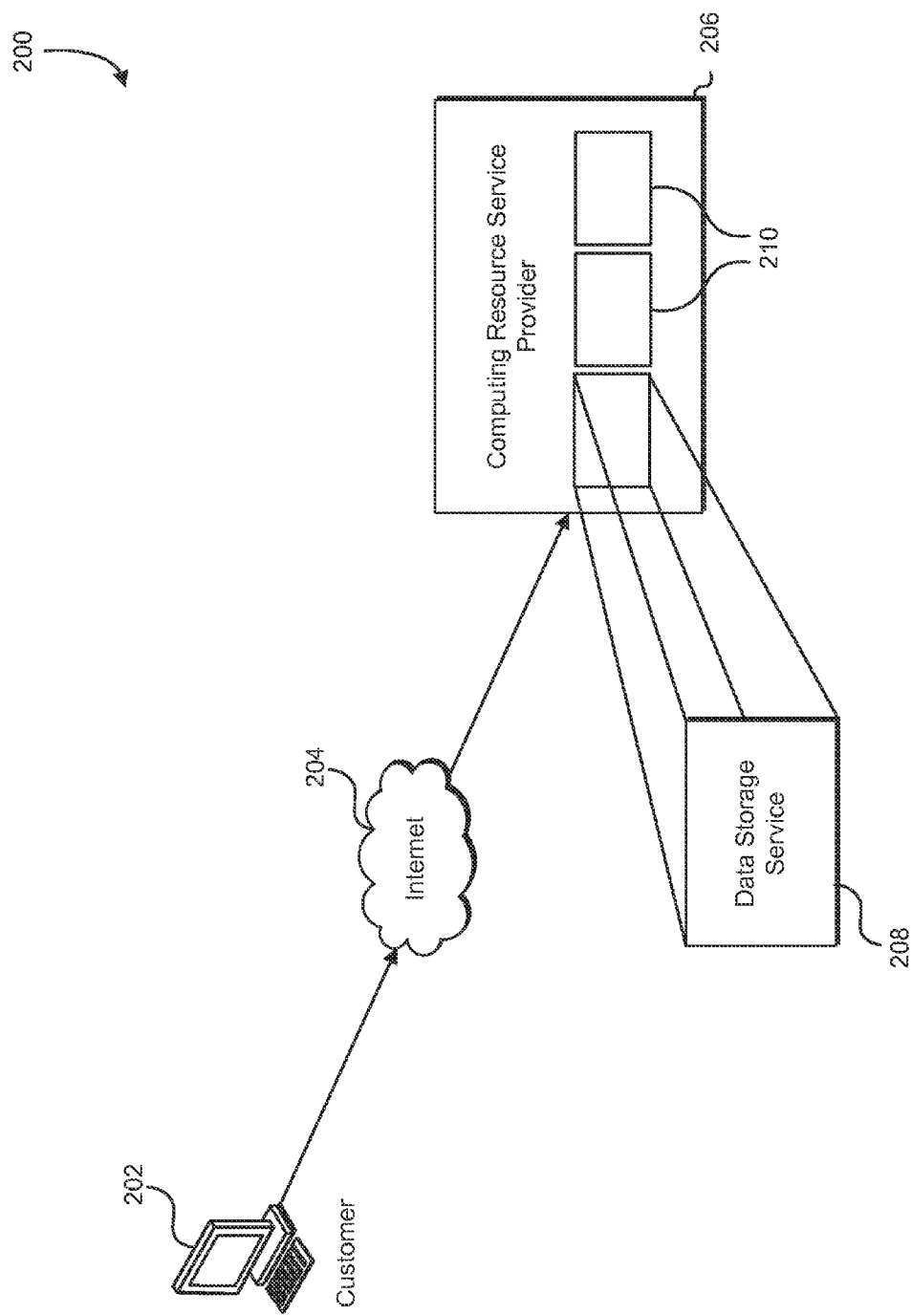
FIG. 2 shows an illustrative example of an environment in which various embodiments can be practiced.

FIG. 2 shows an illustrated example of an environment 200 in which various embodiments of the present disclosure may be practiced. The environment 200 illustrated in FIG. 2 may include components such as those described above in connection with FIG. 1. For example, the environment 200 in FIG. 2 includes a customer 202 and a computing resource service provider 206. The customer 202 and computing resource service provider 206 may be configured such as described above in connection with FIG. 1. As illustrated in FIG. 2, the customer 202 may communicate with the computing resource service provider 206 through one or more communications networks, such as the Internet 204. Some communications from the customer 202 to the computing resource service provider 206 may cause the computing resource service provider 206 to operate in accordance with various techniques described herein or variations thereof.

As noted above, a computing resource service provider 206 may provide various computing resource services to its customers 202. For instance, in this particular illustrative example, the computing resource service provider 206 provides, in addition to the data storage service 208, one or more other services 210, such as virtual computer system services, database services, and/or one or more other types of data storage services to the customer 202. These additional services 210 may be provided in addition to or as an alternative to services explicitly described herein.

The data storage service 208, in various embodiments, comprises a collection of computing resources that collectively operate to store data for customers. The data stored by the data storage service 208 may be organized into data objects. The data objects may have arbitrary sizes except, perhaps, for certain constraints on size. Thus, the data storage service 208 may store numerous data objects of varying sizes. The data storage service 208 may operate as a key value store that associates data objects with identifiers of the data objects. The identifiers of the data objects which may be used by the customer 202 to retrieve or perform other operations in connection with the data objects stored by the data storage service 208. Access to the data storage service 208 may be through appropriately configured API calls, such as web service calls to one or more web servers of the data storage service 208.

Figure 3:
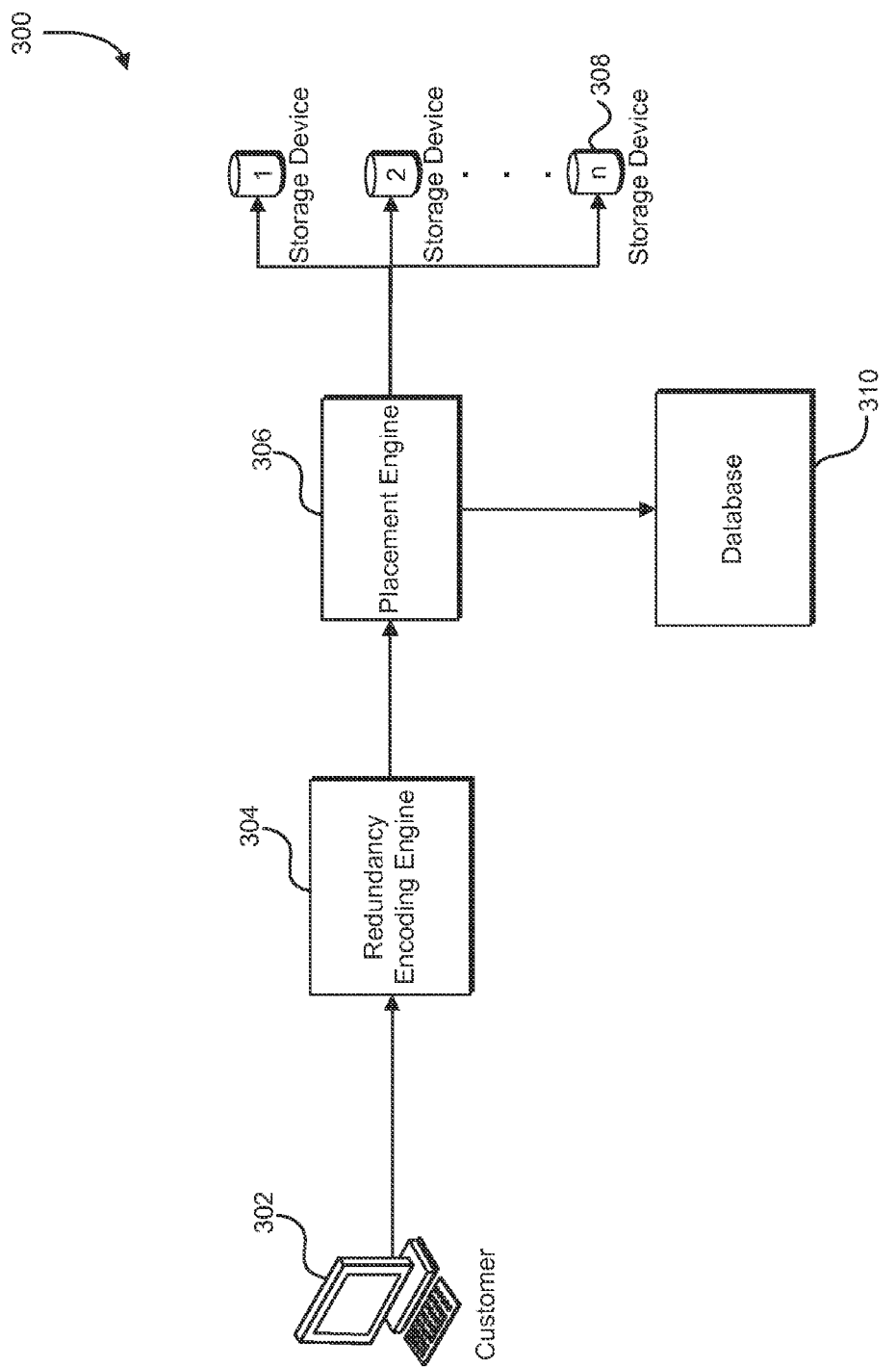
FIG. 3 shows an illustrative example of a process for storing data in accordance with at least one embodiment.

FIG. 3 shows an illustrated example of an environment 300 in which various embodiments of which the present disclosure may be practiced. The environment 300 may be a portion of the environment 200 discussed above. In the environment 300, a data object received from a customer 302 may be processed using a redundancy encoding engine 304 that may utilize a redundancy encoding scheme to divide the data object into smaller data fragments. An example of a process that a redundancy encoding engine 304 may use is erasure coding. Through erasure coding, a data object consisting of various bits of information is reduced into smaller data fragments. Each data fragment may contain more than its proportional share of data such that the combination of data in all data fragments may be greater than that of the parent data object. Thus, not all data fragments are required to recompile the parent data object. While erasure coding is used extensively throughout the present disclosure for the purpose of illustration, the scope of the present disclosure is not necessarily limited to the processes explicitly noted herein.

In various embodiments of the data storage service 300 includes a placement engine 306. The placement engine 306, as illustrated here and as in FIG. 1, may be a computer system or component of a computer system that is configured to apply a set of rules to place data fragments into various locations within the data storage system. Generally, data storage locations within a data storage system may have corresponding physical characteristics. For instance, a location may be defined as on a particular storage device 308, in a particular multiple storage device unit (e.g., JBOD), in a particular data storage system rack, in a particular data center room, in a particular data center or in a particular data center geographical location. Additionally, a location may be defined within a storage device 308. For example, a location may be defined as on a particular platter within a storage device 308 or multiple storage devices, on a particular side of the platter, in a particular region of the platter (e.g., inner annular region or outer annular region), in a particular region within a storage device 308 accessible by a certain head, or in a particular cache in the case of a hybrid storage device.

Rules may be configured to enforce conditions for heterogeneity for the fragments among one or more physical characteristics. For instance, a rule may prohibit the placement of two or more data fragments on the same storage device platter, on the same multiple storage device unit, on the same data storage rack, or in the same data center. Thus, for example, a rule that may be included in the placement engine 306 methodology is one that may prevent two or more data fragments from being placed in a single storage device 308.

Rules may also be more complex in nature. For instance, a rule may include allowing only k of n data fragments to share the same probability of loss or corruption, where k and n are positive integers. Thus, n–k (n minus k) data fragments may need to have a lower probability of loss or corruption, possibly ensuring recoverability of the parent data object. Another example of a more complex rule is one that may prohibit k of n fragments from being stored on the same platter, but on different storage devices. For instance, the rule may state that only two fragments can be stored on platter No. 2 of any storage device. Thus, storing one fragment on platter No. 2 of storage device A, one fragment on platter No. 2 of storage device B, and one fragment on platter No. 2 of storage device C would violate the rule. Accordingly, the placement engine 306 may place the data fragments into the corresponding storage devices 308. Additionally, the placement engine 306 may transmit additional information to a database 310. The database 310 may include, for example, information relating to the parent data object and the location of each data fragment in the storage devices 308. If a customer 302 requests access to a data object through the data storage service 300, the database 310 may serve as a directory for the relevant information necessary to obtain such access.

Figure 4:
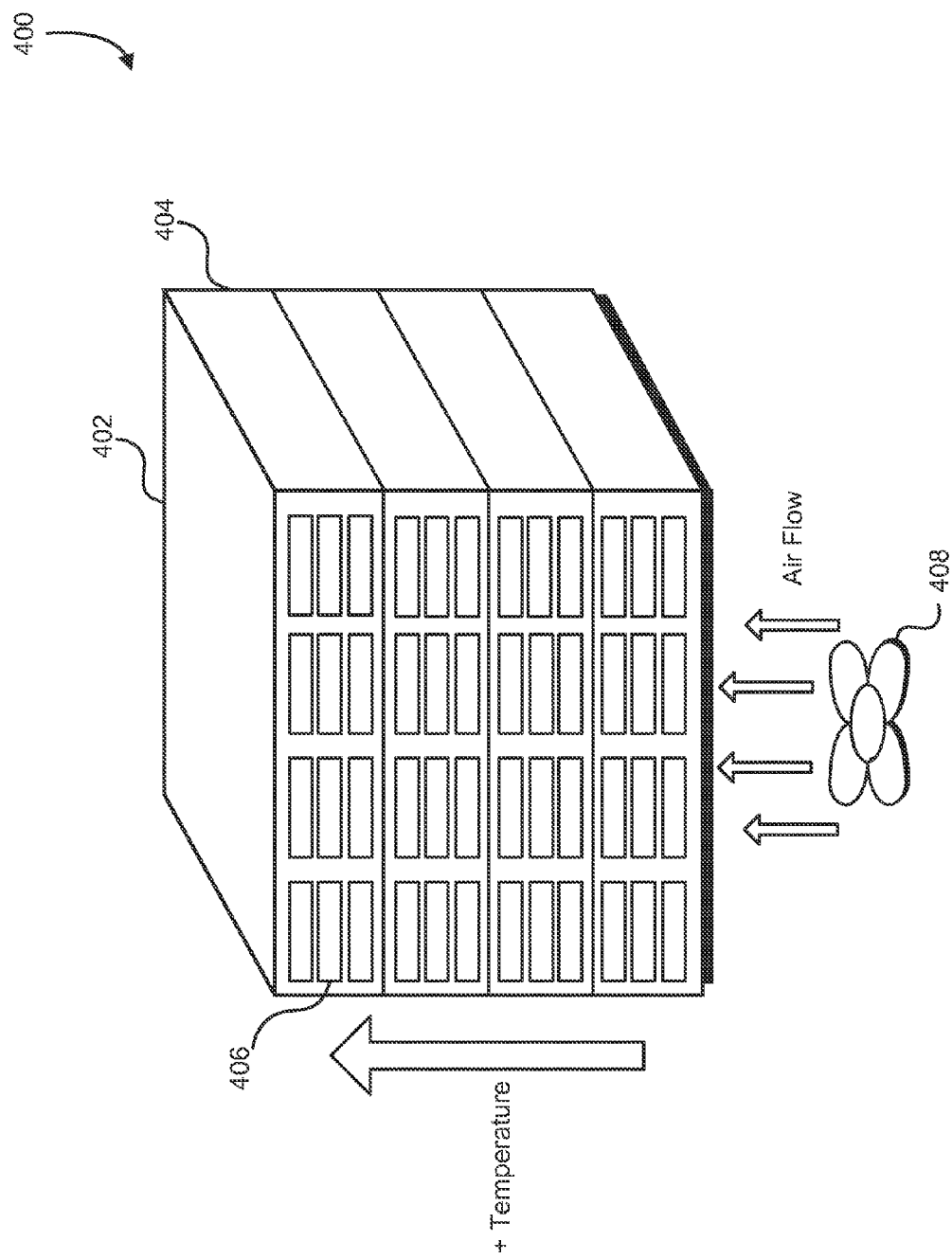
FIG. 4 shows an illustrative example of a data storage system rack containing a plurality of multiple storage device units such as "just a bunch of disks" units (JBODs)

FIG. 4 shows an illustrative example of an environment 400 in which a data storage rack 402 is used to contain various data objects in accordance with various embodiments. The environment 400 illustrated in FIG. 4 may serve as part of the data storage system described above. The data storage rack 402 consists of one or more multiple storage device units, such as multiple storage device units 404, each containing one or more storage devices 406. As noted above, storage devices 406 may be susceptible to failure due to the operational environment. The environment 400 illustrated in FIG. 4 and variations thereof may be subject to, for example, overheating and excess vibration that may damage the storage devices 406.

In the environment 400 illustrated in FIG. 4, a fan 408 is used to provide airflow and thus, a method of cooling the data storage rack 402. Accordingly, the fan 408 serves to prevent overheating in the multiple storage device units 404 and the storage devices 406 contained therein. However, since the fan 408 may be located underneath the data storage rack 402, the temperature within the multiple storage device units 404 may increase in relation to the distance away from the fan 408. Thus, in this example, the storage devices 406 within the data storage rack 402 furthest away from the fan 408 may be more susceptible to damage.

The environment 400 may also include other components necessary for operation of the data storage rack 402. For example, a data storage rack 402 may also contain a power supply, a switch located at the top of the data storage rack 402, and servers in the event that a computer resource service provider employee may need to access the data storage system. It is to be noted that the scope of the present disclosure is not necessarily limited to the data storage rack configurations explicitly noted herein.

Figure 5:
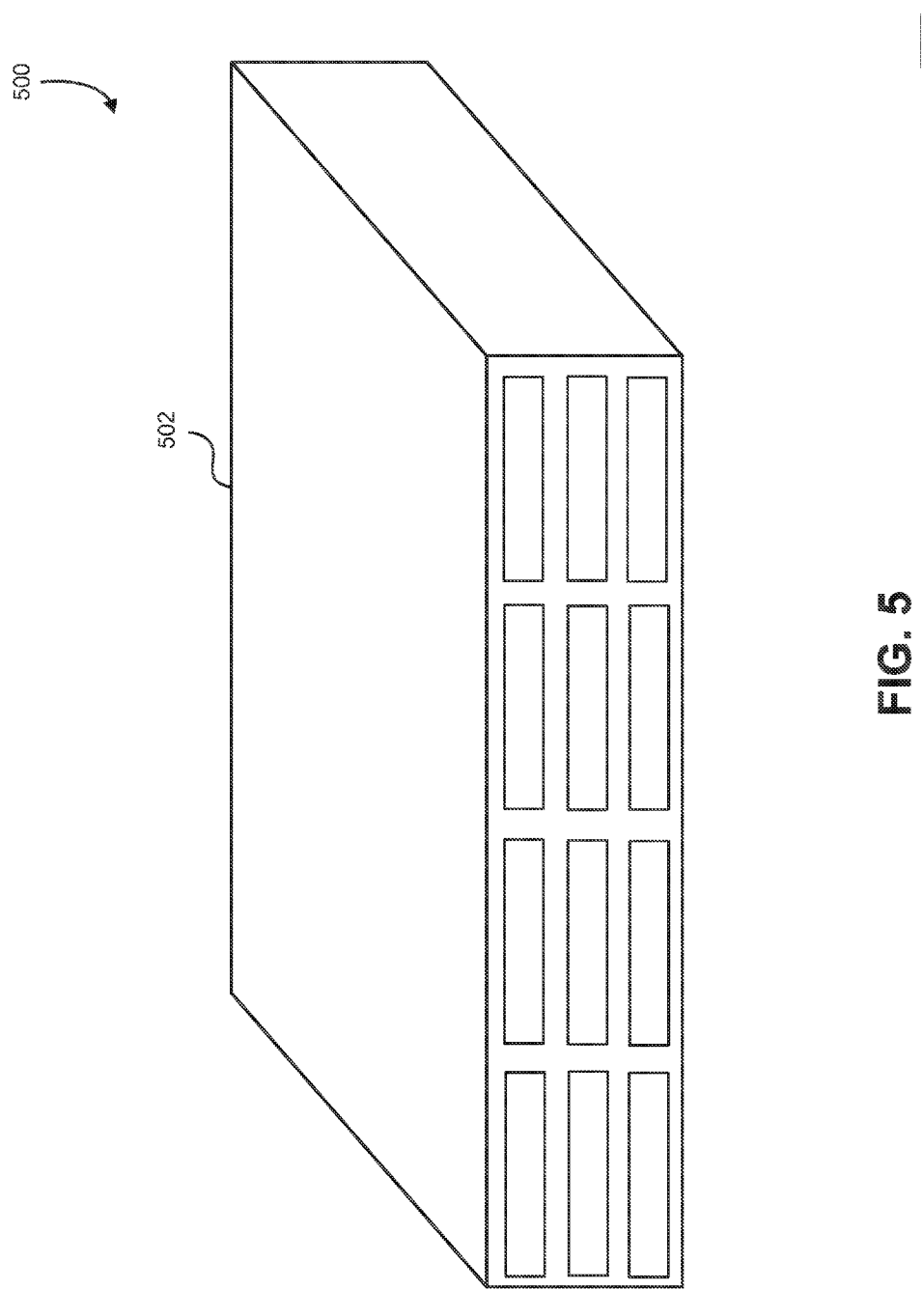
FIG. 5 shows an illustrative example of a multiple storage device unit such as a JBOD that may be contained within a data storage rack.

As discussed above, a data storage rack consists of one or more multiple storage device units. FIG. 5 shows an illustrative example of a multiple storage device unit 500 that may be incorporated into a data storage rack as illustrated in FIG. 4. As illustrated, a multiple storage device unit 500 may consist of an enclosure 502 containing one or more storage devices arranged in an array. In this example, the storage devices enclosed in the multiple storage device unit 500 are arranged in three rows, each containing four storage devices for a total of twelve storage devices in the enclosure 502. However, multiple storage device units 500 may consist of any number of storage devices and may be arranged in varying ways. For example, a multiple storage device unit 500 may comprise rows of storage devices (oriented horizontally and/or vertically) that are deeper into the multiple storage device unit 500, giving each storage device a three-dimensional position within the multiple storage device unit 500. Additionally, some storage devices may be otherwise oriented within the multiple storage device unit (e.g., askew or placed diagonally).

Figure 6:
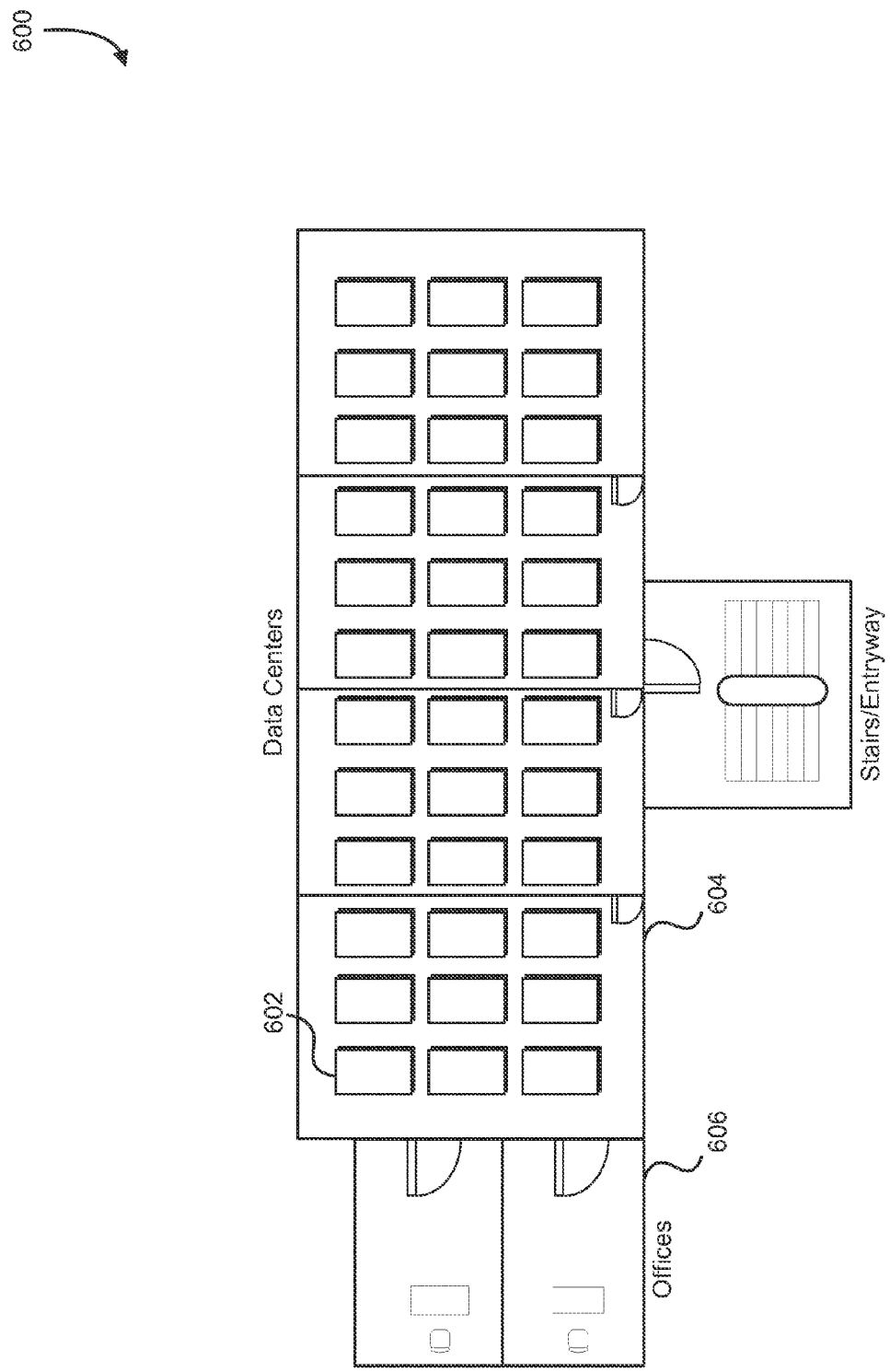
FIG. 6 shows an illustrative example of a facility that may host a data storage system.

FIG. 6 shows an illustrative example of an environment 600 in which a data storage service may physically reside. As noted above, a data storage rack 602 may consist of one or more multiple storage device units. These multiple storage device units may contain one or more storage devices arranged in various configurations. In the environment 600, the data storage racks 602 may be maintained in an edifice containing one or more data centers 604. These data centers 604 may be maintained by one or more of the computing resource service provider employees. Thus, the data center may have additional offices 606 in order to support various employee tasks.

In the event of a hardware failure, employees at the facility may be able to examine the root cause of the failure and may catalog this information. This may enable the employees to update the rules implemented in the placement engine in order to prevent one or more failure modes, as noted above.

Figure 7:
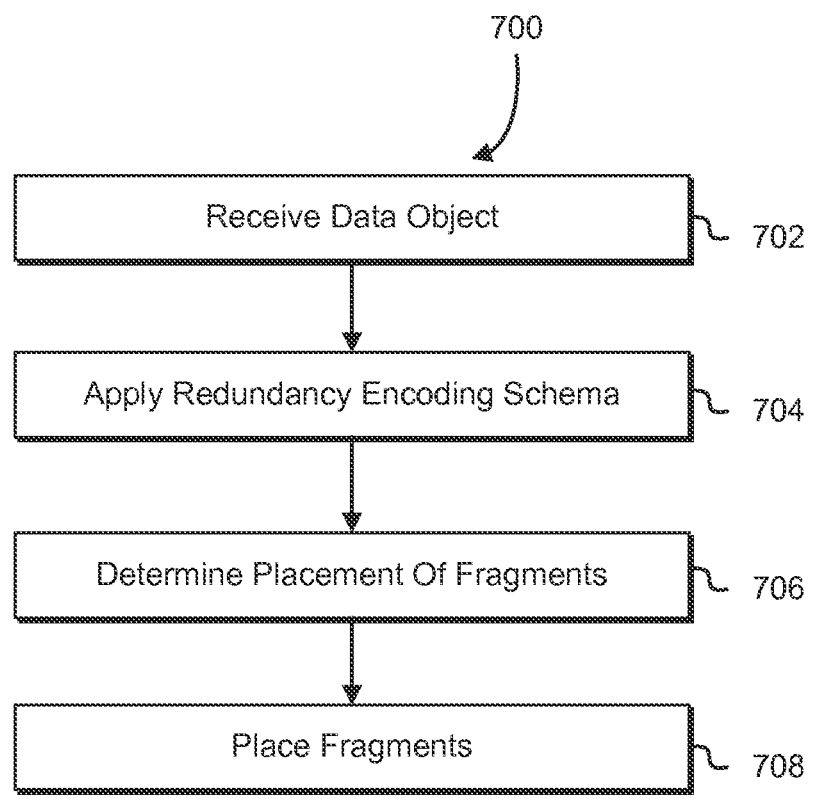
FIG. 7 shows an illustrative example of a process for storing a data object in accordance with at least one embodiment.

FIG. 7 shows an illustrative example of a process 700 for storing a data object in accordance with various embodiments. The process 700 illustrated in FIG. 7 and variations thereof may be performed by any suitable system, including a system that may utilize a redundancy encoding engine to convert a data object into numerous data fragments, a placement engine that may include a set of rules for placing the data fragments into the data storage system and a series of storage devices where the data fragments may be stored as illustrated in FIG. 3. In an embodiment the process 700 includes receiving 702 a data object from a customer for storage in the data storage system. The data object may be received in any suitable manner. For example, as noted above, a customer may access the data storage service through one or more communications networks, such as the Internet. Accordingly, the request to store a data object may be received as an appropriately configured web service request or other API call.

Upon receipt 702 of the data object from the customer, the process 700 may include applying a redundancy encoding scheme 704 to convert the parent data object into numerous data fragments for storage. The encoding scheme may include, for example, erasure coding as noted above such that not all data fragments are necessary to recompile the parent data object in the future. Again, while erasure coding is used extensively throughout the present disclosure for the purpose of illustration, the scope of the present disclosure is not necessarily limited to the processes explicitly noted herein.

Once the parent data object has been reduced into smaller data fragments, the process 700 may include determining the placement 706 of the various data fragments. As noted above, in various embodiments, the placement of data fragments into the data storage system may be made using a placement engine. Accordingly, the computing resource service provider may incorporate various rules, such as rules to enforce heterogeneity as described above, into the placement engine such that, for example, the data fragments are catalogued in a database and assigned a data storage location within the data storage system. Additionally, as discussed below, the placement engine may be updated based on the detection of failures within the data storage system such that the placement of the data fragments minimizes the risk of data loss or corruption.

Once the placement engine has determined the location for each data fragment, the process 700 may place the fragments 708 into a data storage location within the data storage system. The data fragments may be written to storage devices for storage. As noted above, the storage devices may consist of spinning magnetic media, magnetic tape storage devices, SSD, or any other form of data storage device. While each type of storage device may be susceptible to various failure modes, the placement of the fragments 708 may be made to mitigate the risk of failure.

In addition, various additional operations may be performed in connection with the process 700 illustrated in FIG. 7. As noted below, for example, the data storage system may obtain the current environment where a data fragment is to be stored and delay access to the corresponding storage device until it is permitted to do so. Additionally, the data storage system may encrypt the data object obtained from the customer or the data fragments generated by the redundancy encoding engine as illustrated in FIG. 3. Accordingly, the process 700 may, in various embodiments, include performing such operations.

As noted above, the placement engine may be used to determine the proper placement of data fragments in the data storage system. The rules governing the proper placement of the data fragments may be determined by, for example, the computer resource service provider employees, through repeated iterations of the process illustrated in FIG. 3, or an external condition, such as a hardware failure. In some embodiments, customers of a computing resource service provider are provided the ability, such as through a web services or other interface, to provide placement conditions that are used by the computing resource service provider to generate rules for a placement engine. The conditions for data placement may include conditions discussed above. The conditions may be specified by the customers explicitly (e.g., by specifying the rules themselves) or implicitly, such as by selecting one of several redundancy levels, each level corresponding to a set of placement rules. Charges to customers may vary based at least in part on the data placement rules, if any, that the customers specify.

Figure 8:
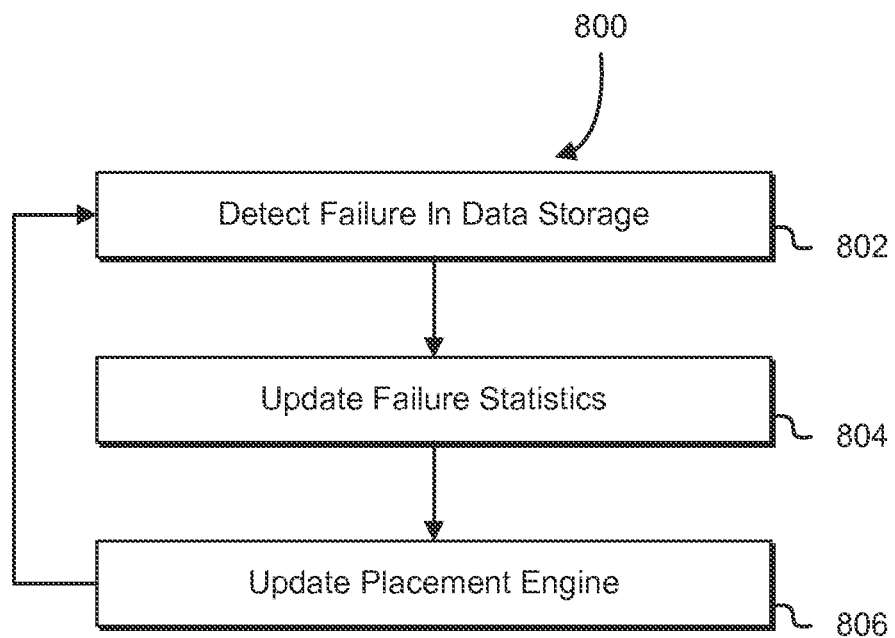
FIG. 8 shows an illustrative example of a process for tracking hardware failures in a data storage system in accordance with at least one embodiment.

FIG. 8 shows an illustrative example of a process 800 for tracking hardware failures in a data storage system in accordance with at least one embodiment. The process 800 illustrated in FIG. 8 and variations thereof may be performed by any suitable system, including one that may utilize a placement engine to determine where data fragments should be stored. In the process 800, the data storage system may detect 802 a failure within the system. For example, if there is a storage device failure within a multiple storage device unit, a signal may be sent to the data storage system and to the computer resource service provider employees notifying them of the failure. Failures may be detected based on Self-Monitoring Analysis and Reporting Technology (SMART) built into storage devices within the multiple storage device unit. Additionally, a signal may be sent if there is a more serious fault in the data storage system, such as a power supply failure or ventilation failure within a data storage rack or a catastrophic power failure within the data center facility.

Upon determining the severity and impact of the detected failure, the data storage system or a computer resource service provider employee may record the particular failure mode, for example, in a log that contains a historical record of all previous faults in the data storage system. Accordingly, this log may be used to update 804 the failure statistics of the data storage system. One purpose for updating 804 the failure statistics is to, for example, obtain the likelihood of future hardware faults within the data storage system. This may serve one or more functions. For instance, if a server fan generates vibrations that may decrease the service life of specific storage devices or may cause intermittent failures in those storage devices; this information may be of value to a computer resource service provider such that the provider may seek to limit the use of these specific storage devices. Additionally, if a power supply within a data service rack is producing heat that may exceed the tolerance of certain multiple storage device unit components, such as wiring bundles or internal storage devices, resulting in different failure modes, a computer resource service provider may seek to limit access to that specific multiple storage device unit or limit the amount of data that is stored in the data service rack.

With sufficient information obtained through updating 804 the failure statistics, a computer resource service provider employee or the data storage system, through one or more algorithms, may update 806 the placement engine. An update 806 to the placement engine may include a modification or implementation of a new rule that may be used to determine the placement of one or more data fragments within the data storage system, as illustrated in FIGS. 1 and 3. For example, a new rule may be implemented that prevents multiple data fragments with the same parent data object from being stored in, for instance, the same storage device platter or storage device. Additionally, this rule may include corollaries such that no two or more data fragments are, for example, stored in the same data storage rack, in the same room of a data center, in the same data center, or in the same geographical designation.

The rules that may be implemented as noted above may not be static. For example, if the data storage system detects 802 an additional hardware failure, the process 800 may iterate, which may result in further updates 804 to the failure statistics. Thus, the placement engine may be updated 806 at any time based on the frequency of hardware failures in the data storage system.

Figure 9:
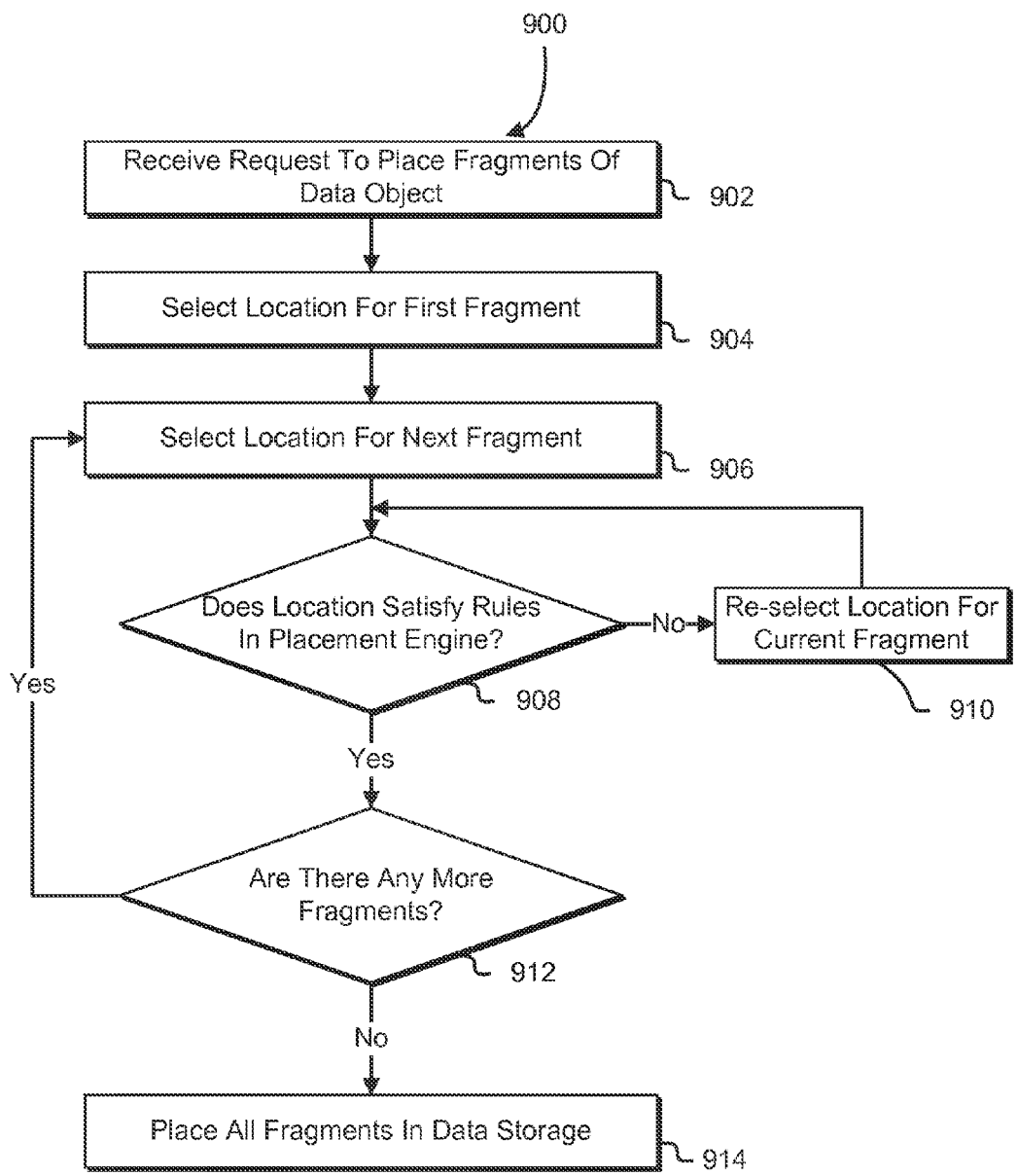
FIG. 9 shows an illustrative example of a process for placing data object fragments into data storage in accordance with at least one embodiment.

FIG. 9 is an illustrative example of process 900 for storing a data object in accordance with at least one embodiment. As noted above, a data object may be converted into numerous data fragments using a redundancy encoding engine, such as the one illustrated in FIG. 3. It is at this point that the process 900 may receive 902 a request to place the data fragments of the parent data object into the data storage system. At this point, a placement engine, such as the one illustrated in FIG. 3, may select the location of the first segment 904. The selection of the location of the first segment 904 may be independent of any known hardware failure modes within the data storage system and may be independent of the placement of other data fragments with the same parent data object. However, rules may be implemented within the placement engine that may make it necessary for the first segment to be stored in a specific location.

Once the first data fragment location has been selected 904, the process 900 may include selecting a location for the next data fragment 906. Given the location of the first data segment, a placement engine may examine 908 a location for the next data fragment based on the implemented rules, such as those noted above, contained therein. If the selected location does not satisfy the rules implemented in the placement engine, the data storage system may select a new data storage location 910 for the current data fragment. For example, if the placement engine has determined that the first data fragment is to be stored in multiple storage device unit X and a rule implemented within the placement engine states that no two or more data fragments are to be stored in the same multiple storage device unit, the placement engine may examine the location assigned to any subsequent data fragment and may re-select that location if it is currently assigned to be stored in multiple storage device unit X. If the location for the data fragment satisfies the rules set forth in the placement engine, the data storage system may evaluate 912 whether any more data fragments remain. If there are more data fragments present requiring a location, the process 900 may include determining 906 a location for said data fragment. In this fashion, the location of each data fragment may satisfy the various rules contained in the placement engine.

Once each data fragment has been assigned a location that satisfies all the rules set forth in the placement engine, the process 900 may write 914 all the data fragments into the data storage system. While the implementation of rules is used extensively throughout the present disclosure for the purpose of illustration, the scope of the present disclosure is not necessarily limited to the processes explicitly noted herein. For instance, a placement engine may include, in addition to rules limiting the possible locations for subsequent data fragments, a series of algorithms that may be performed to select, based on prior iterations of process 900, a prior set of locations for the current data fragments being stored into the data system. The list of prior sets may include locations used in the past that have resulted in a reduction of the risk of data loss or corruption.

Figure 10:
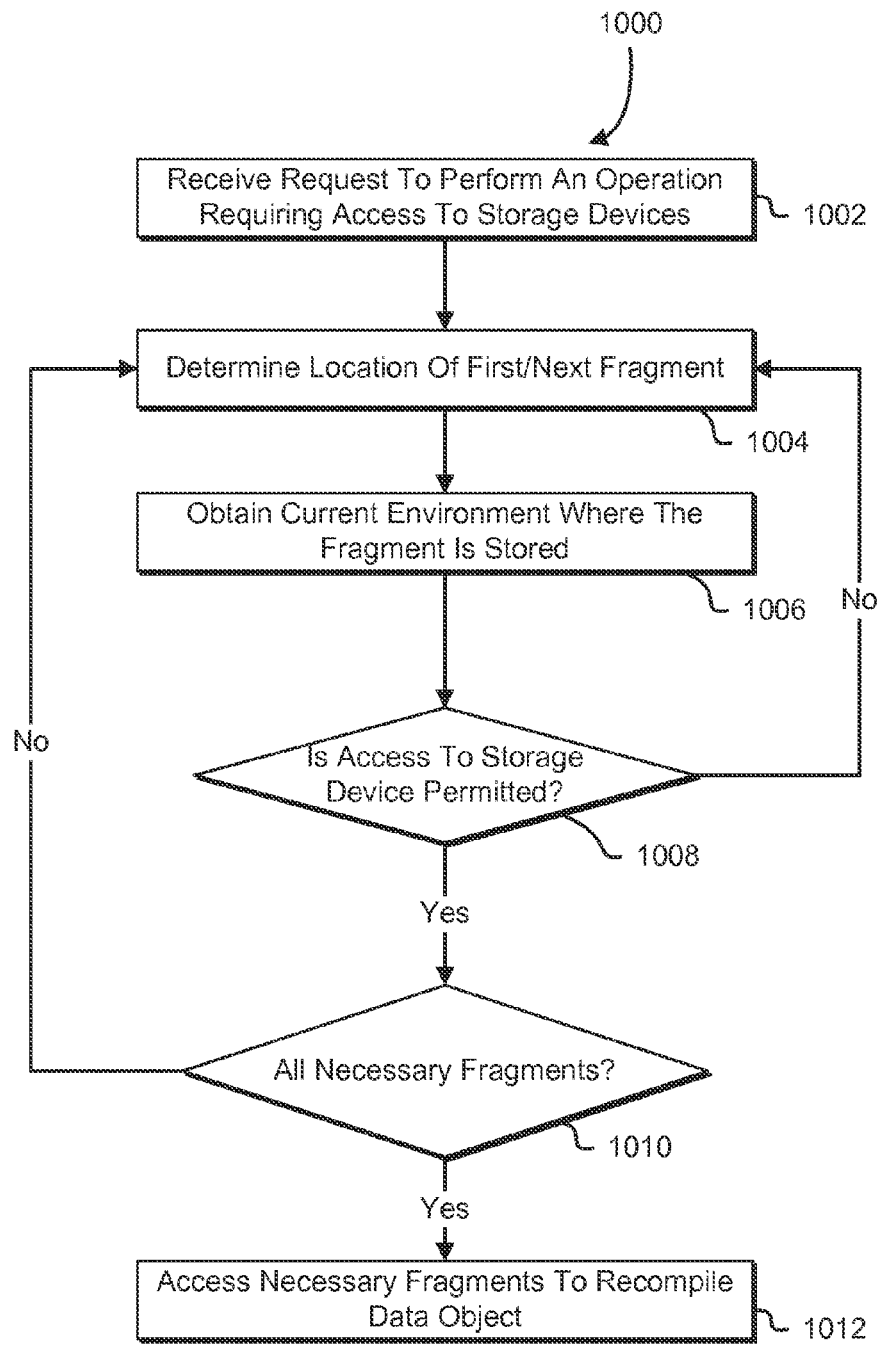
FIG. 10 shows an illustrative example of a process for retrieving a data object from data storage in accordance with at least one embodiment.

As noted above, storage devices may be susceptible to damage resulting from, for example, vibrations and overheating. In the case of storage devices that utilize spinning magnetic media, normal operation of such storage devices may result in vibrations that may adversely affect the surrounding data environment. Accordingly, FIG. 10 is an illustrative example of a process 1000 for retrieving a data object from data storage in a manner that may reduce the risk of data loss due to adverse surrounding conditions, in accordance with at least one embodiment.

Similar to the process 900 detailed above, the process 1000 may include receiving 1002 a request from, for example, a customer or a computing resource service provider to perform an operation that may require access to a variety of storage devices. These storage devices may contain data fragments that are associated with a parent data object. The data storage system, upon receiving 1002 a request, may refer to a database as noted above to determine 1004 the location of a data fragment stored in the data storage system. Once the location has been determined 1004, the data storage system may obtain 1006 the current activity state of the environment surrounding the location of the current data fragment. For instance, if the current data fragment is located in a particular storage device, the environment may include any storage devices in spatial proximity (e.g., share a vibration transmission medium or a common mounting fixture) to the storage device containing the current data fragment and any multiple storage device units in spatial proximity to the multiple storage device unit with the targeted storage device. Additionally, the environment may include the current temperature and moisture content surrounding the targeted storage device, as well as barometric pressure or pollutants in the air. The current activity state may refer to the operational state of any components within a data storage system. For instance, for a storage device, the current activity state may refer to whether the storage device is spinning (e.g., read/write/delete access of the storage media within the storage device) and at what velocity, or if it is idle. As noted above, a storage device that utilizes spinning magnetic media that is in operation may generate vibrations and heat. Thus, the currently activity state of a storage device may have a corresponding effect on the surrounding environment.

The evaluation of the surrounding environment may include one or more analyses based on known failure modes. The severity of these failure modes may be known to computing resource service provider through a process, such as the process 800 noted above, or through known manufacturing tolerances. For example, a manufacturer, prior to delivery of any hardware components (e.g., storage devices, multiple storage device units, data storage racks) may perform tests to determine the tolerances and/or service life of these components. This may include the use of testing devices such as a storage device embedded with instrumentation to determine surrounding adverse conditions (e.g., excess heat, vibrations, moisture). The manufacturer may thus obtain information detailing the risk of damage to any hardware component based on the surrounding environment. This information may be transmitted to the computing resource service provider, for example, during the sale of hardware components to the computing resource service provider or when initially detected by the manufacturer. In this instance, manufacturers may be organizational entities, such as corporations or other organizations.

The computing resource service provider may use statistics obtained using the process 800 or the information obtained from a manufacturer, as noted above, to create a set of conditions that would prevent access to a storage device should the surrounding environment increase the risk of data loss or corruption. For example, the computing resource service provider may provide a set of conditions that are based on spatial proximity to the storage device that is to be accessed. For instance, if one or more storage devices adjacent to one with a data fragment necessary for access to a parent data object are currently active (e.g., a storage device is performing one or more operations on its media), the data storage system may deny access to the storage device containing the data fragment until all adjacent storage devices are idle. Spatial proximity may also not be limited to adjacent storage devices. For instance, if, statistically, vibrations resulting from currently active storage devices that are not adjacent to the targeted storage device, but share a vibration transmission medium with the targeted storage device or a common mounting fixture with the targeted storage device, would result in greater potential damage to the targeted storage device, the data storage system may also deny access to the storage device containing the data fragment until these active storage devices are idle. Thus, the process 1000, using the conditions that may be implemented by the computing resource service provider, may include a determination 1008 of whether the storage device containing the current data fragment may be accessed. If access to the present storage device is not permitted due to an adverse surrounding condition, the data storage system may bypass the current data fragment and determine 1004 the location of the next data fragment. Otherwise, the data storage system may seek to determine 1010 whether all the necessary data fragments have been located and the environment is favorable for retrieval of the data fragments.

It is important to note that the conditions noted above may be implemented in various ways. For instance, the data storage system may contain a small script that is executed when access to a storage device is required. The script may examine the storage devices adjacent to the storage device containing the necessary data fragment and generate a file containing the status of all adjacent storage devices. This file, in turn, may be processed by the data storage system consistent with the process 1000.

As noted above in FIG. 3, a redundancy encoding engine utilizing a redundancy encoding scheme may be used to reduce a data object into smaller data fragments. Through erasure coding, not all data fragments generated using the redundancy encoding engine may be necessary to restore the parent data object. Accordingly, the process 1000 may include evaluating 1010 whether the data storage system has the necessary data fragments to restore the parent data object. This evaluation may occur every time the data storage system has determined 1008 that a storage device containing a data fragment may be accessed, as noted above. If the data storage system has determined that the storage devices containing the necessary data fragments may be accessed, the data storage system may permit access to the required storage devices. However, if more data fragments are necessary to recreate the parent data object, the data storage system may select the next data fragment and determine 1004 the location of said data fragment within the data storage system.

Once determined 1010 that all data fragments necessary to recreate the parent data object have been identified and the data storage system has determined 1008 that there is permission to access the storage devices that contain the necessary data fragments, the data storage system may access 1012 the data fragments and recompile the parent data object.

As with all processes described herein, variations of the process 1000 are considered as being within the scope of the present disclosure. For instance, as noted above, the process 1000 may include determining 1004 the location of a data fragment if access to a storage device 1008 is prohibited due to an adverse condition being present. An example of a variation of the process 1000 may be one in which the data storage system may wait until access to a storage device is permitted prior to determining 1004 the location of the next data fragment. Another example of a variation of the process 1000 may be one in which the data storage system opts to obtain all data fragments (or a greater number of data fragments) as opposed to just the minimum number of fragments necessary for constructing the data object, as noted above.

Figure 11:
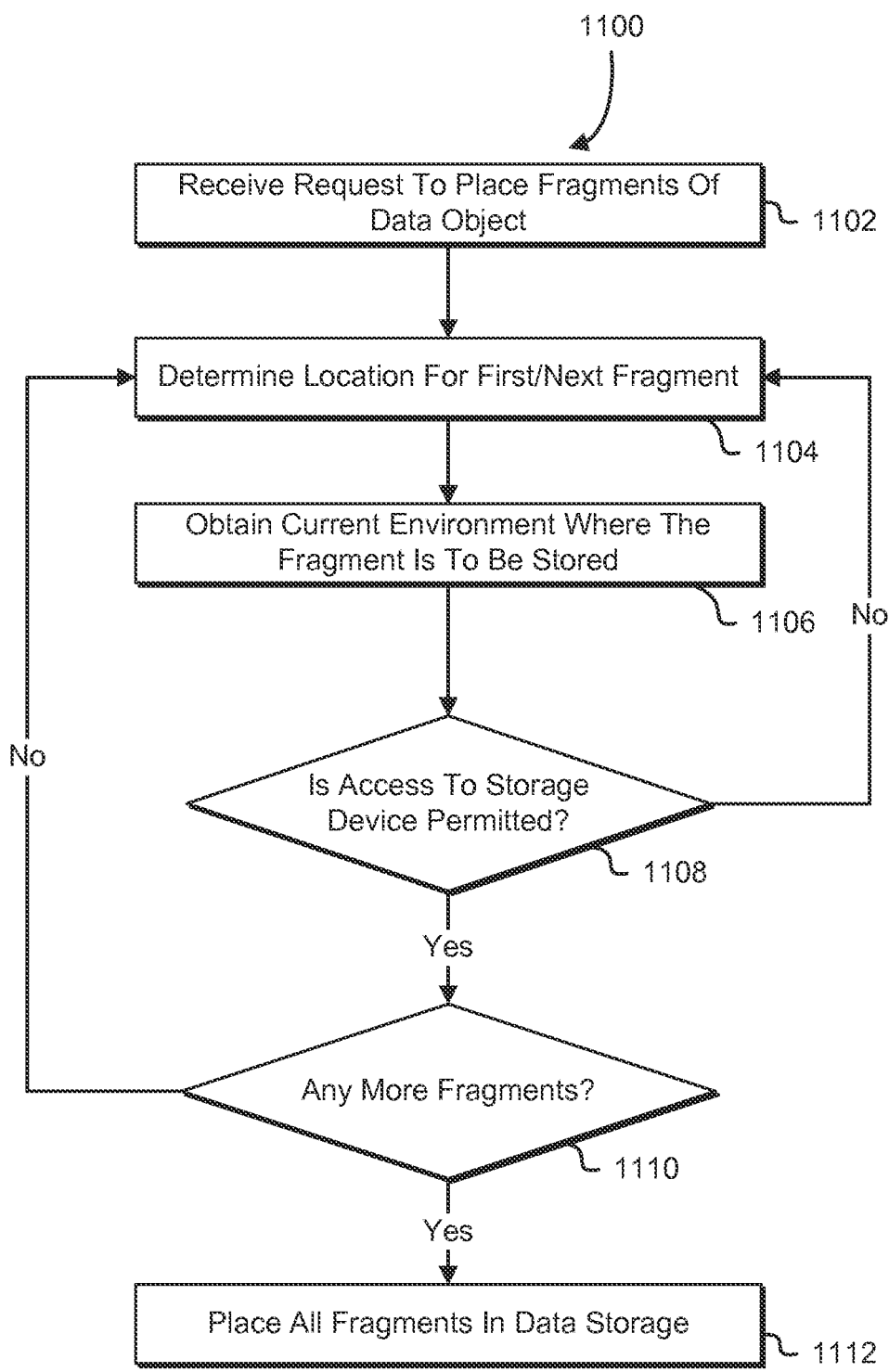
FIG. 11 shows an illustrative example of a process for placing data object fragments into data storage in accordance with at least one embodiment.

Access to a storage device may not be limited to read operations only. Accordingly, FIG. 11 is an illustrative example of a process 1100 for placing data object fragments into data storage in a manner that may reduce the risk of data loss due to adverse surrounding conditions, in accordance with at least one embodiment. Much like the process 900 noted above, the process 1100 may include receiving 1102 a request to place one or more data fragments of a parent data object into the data storage system.

Similar to the process 900 noted above, the process 1100 may include determining 1104 a location to store the first data fragment. This determination 1104 may be made using a placement engine, such as illustrated in FIG. 3. As noted above, the selection of the location of the first segment may be independent of any known hardware failure modes within the data storage system and may be independent of the placement of other data fragments with the same parent data object. However, the process 1100 may include subsequently obtaining 1106 the current state of the environment surrounding the desired location for the data fragment. The evaluation of the surrounding environment may be conducted in a manner the utilizing techniques described above. Additionally, the computing resource service provider may update the rules incorporated into the placement engine based on the process 800 described above or on information received from a manufacturer of a data storage system component.

As in the process 1000, the process 1100 may include a determination 1108 of whether the access to the storage device selected for the data fragment storage is permitted. This determination may be made using a method as described above. If access to the selected storage device is not permitted, the data storage system may proceed to determine 1104 the location of the next data fragment. Otherwise, the data storage system may seek to determine 1110 whether all the data fragments associated with the parent data object have been located and the environment is favorable for storage of the data fragments. Once the data storage system has permission to access the storage devices identified to store all the data fragments, the data storage system may place 1112 these data fragments in the respective storage devices.

As with all processes described herein, variations of the process 1100 are considered as being within the scope of the present disclosure. For instance, the process 1100 may instead include determining a new location for a data fragment if the selected location is not permitted due to an adverse condition in the environment. Thus, the data storage system may focus on one data fragment and refrain from moving on to the next data fragment until a suitable location has been chosen. Another example may be based on a more complex rule in the placement engine, such as one that would allow k of n data fragments to share the same probability of loss or corruption. Thus, the data storage system may include ignoring the environment surrounding the selected location of the k data fragments. Once n−k fragments remain, the data storage system would begin evaluating the surrounding environment of these fragments and select an appropriate location in conformity with process 1100.

Figure 12:
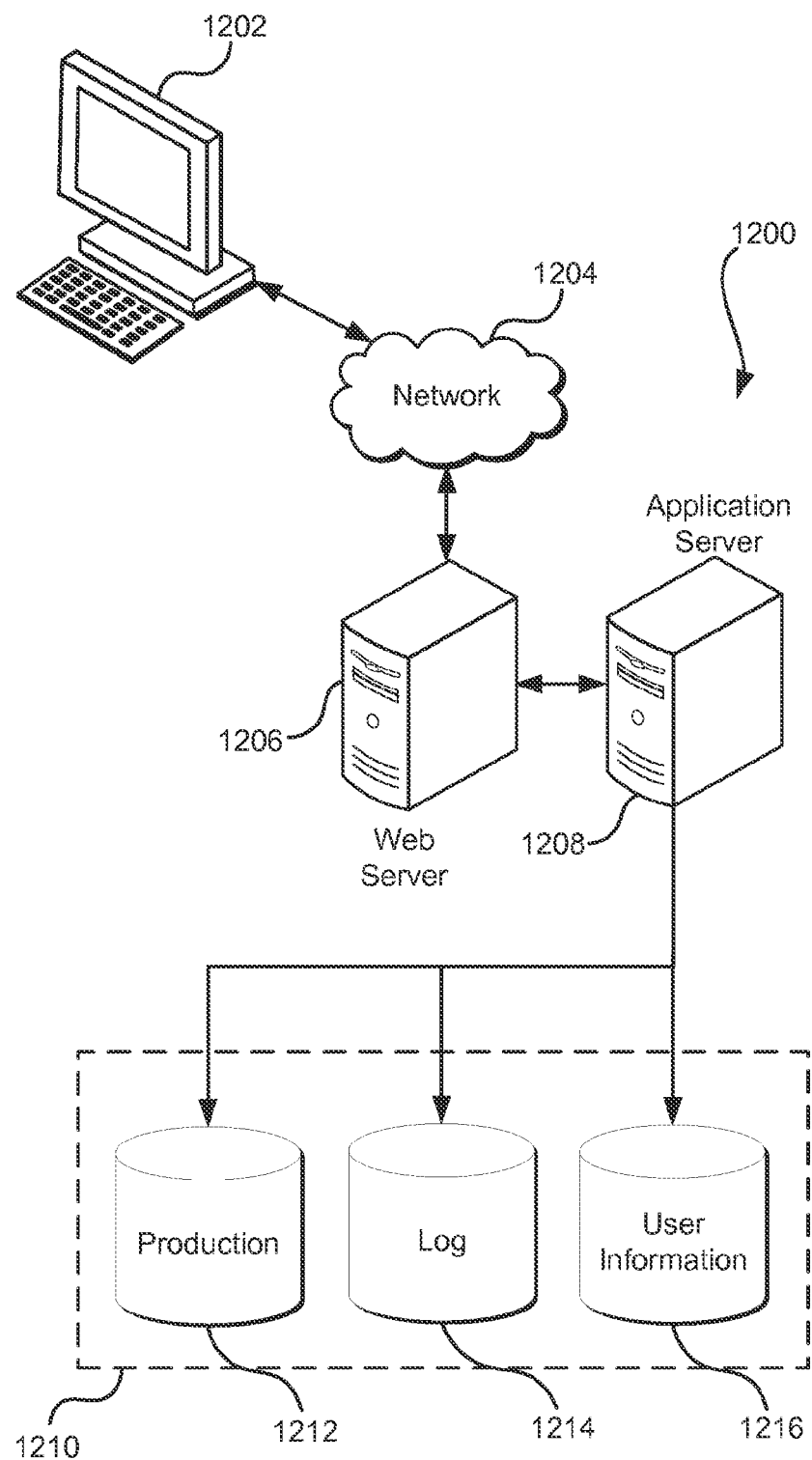
FIG. 12 shows an illustrative example of an environment in which various embodiments may be practiced.

FIG. 12 illustrates aspects of an example environment 1200 for implementing aspects in accordance with various embodiments. As will be appreciated, although a web-based environment is used for purposes of explanation, different environments may be used, as appropriate, to implement various embodiments. The environment includes an electronic client device 1202, which can include any appropriate device operable to send and receive requests, messages or information over an appropriate network 1204 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling some (even a majority) of the data access and business logic for an application. The application server may provide access control services in cooperation with the data store and is able to generate content such as text, graphics, audio and/or video to be transferred to the user, which may be served to the user by the web server in the form of HyperText Markup Language ("HTML"), Extensible Markup Language ("XML") or another appropriate structured language in this example. The handling of all requests and responses, as well as the delivery of content between the client device 1202 and the application server 1208, can be handled by the web server. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The data store 1210 can include several separate data tables, databases or other data storage mechanisms and media for storing data relating to a particular aspect of the present disclosure. For example, the data store illustrated may include mechanisms for storing production data 1212 and user information 1216, which can be used to serve content for the production side. The data store also is shown to include a mechanism for storing log data 1214, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1202. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   under the control of one or more computer systems configured with executable instructions,
   applying a redundancy encoding scheme to generate a plurality of data fragments configured such that a proper subset of the plurality of data fragments is sufficient to construct a data object;
   storing the plurality of data fragments in a data storage system, the data storage system comprising a plurality of storage devices, each storage device of a subset of the plurality of storage devices determined to, when concurrently active with a storage device usable to perform the operation, potentially cause interference with the storage device, the subset comprising multiple storage devices;
   receiving a request to perform an operation to retrieve the data object;
   determining, based at least in part on current activity states of subsets of the plurality of storage devices that contain the plurality of data fragments, a manner in which to perform the operation from a plurality of manners in which the operation can be performed, the plurality of manners including at least one manner that involves reading fewer than all of the plurality of data fragments, and the current activity state of a subset that contains a data fragment indicating whether one or more storage devices of the subset other than a storage device that contains the data fragment is currently active; and
   causing the operation to be performed according to the determined manner.

2. The computer-implemented method of claim 1, wherein the subset of the plurality of storage devices comprises one or more storage devices physically adjacent to the storage device.

3. The computer-implemented method of claim 1, wherein an unread data fragment is selected according to risk of data loss or corruption from an environment around a storage device that contains the unread data fragment.

4. The computer-implemented method of claim 1, wherein the request to perform the operation is a request to obtain data for a data object requested to be retrieved from the data storage system.

5. The computer-implemented method of claim 1, wherein:
the data storage system operates in support of a data storage service provided by a computing resource service provider to a plurality of customers; and
the request to perform the operation is in connection with data of a customer of the plurality of customers.

6. A computer-implemented method, comprising:
under the control of one or more computer systems configured with executable instructions,
receiving a request to perform an operation performable, at least in part, by accessing a storage medium of a data storage device, the data storage device corresponding to a set of devices determined to potentially interfere with operation of the data storage device, the set of devices comprising multiple devices, the operation directed to retrieving from the storage medium a data fragment of a data object that is encoded according to a redundancy encoding scheme as a plurality of data fragments configured such that a proper subset of the data fragments is sufficient to construct the data object;
determining, based at least in part on a current activity state of the set of devices, a manner in which the operation can be performed from a plurality of manners, the plurality of manners including: preventing access to the storage medium of the data storage device if the current activity state corresponds to a risk of data loss or corruption from operation of data storage devices other than the data storage device; and at least one manner that involves reading fewer than all of the plurality fragments; and
performing the operation in the determined manner.

7. The computer-implemented method of claim 6, wherein the data storage device utilizes one or more mechanical moving parts to access data.

8. The computer-implemented method of claim 6, wherein access to the storage medium of the data storage device includes the ability to perform read, write or delete operations on the data storage device.

9. The computer-implemented method of claim 6, wherein the current activity state indicates whether one or more device states of the set of devices satisfy one or more conditions for potentially interfering with operation of the data storage device.

10. The computer-implemented method of claim 6, wherein the set of devices each determined to potentially cause error satisfy one or more conditions for spatial proximity to the requested data storage device.

11. A system, comprising:
a plurality of data storage devices;
one or more processors;
memory including instructions that, when executed by the one or more processors, cause the system to:
determine current activity states of sets of data storage devices, a current activity state of an individual set of data storage devices obtained from activities of a plurality of data storage devices determined to potentially interfere with operation of a particular data storage device, the individual set of data storage devices comprising multiple data storage devices;
determine, based at least in part on the determined current activity states, a manner in which an operation to retrieve a plurality of data fragments encoded such that a proper subset of the plurality of data fragments is sufficient to construct a data object is performable, from a plurality of manners, the plurality of manners including at least one manner comprising selection of at least a proper subset of the plurality of data fragments for reading according to current activity states of sets of storage devices containing the plurality of data fragments to obtain a selected proper subset, the selected proper subset comprising fewer than all of the plurality of data fragments; and cause the operation to be performed in accordance with the determined manner.

12. The system of claim 11, wherein the data storage devices of the plurality of data storage devices perform one or more operations utilizing one or more mechanical moving parts.

13. The system of claim 11, wherein the operation includes a read, write or delete operation on the particular data storage device.

14. The system of claim 11, wherein the current activity state is based at least in part on whether at least a subset of data storage devices in the set are active.

15. The system of claim 11, wherein the storage devices determined to potentially interfere with operation of the particular data storage device are determined to be spatially proximate to the particular data storage device.

16. The system of claim 15, wherein the storage devices determined to be spatially proximate to the particular data storage device share a common mounting fixture.

17. The system of claim 15, wherein the storage devices determined to be spatially proximate to the particular data storage device share a vibration transmission medium.

18. One or more non-transitory computer-readable storage media having stored therein instructions that, when executed by one or more processors of a system, cause the system to:
apply a redundancy encoding scheme to generate a plurality of data fragments configured such that a proper subset of the plurality of data fragments is sufficient to construct a data object;
store the plurality of data fragments in storage devices within a data storage system;
select a data storage device within the data storage system in which to perform an operation to read a data fragment of the plurality of data fragments;
determine a manner of performing the operation, from a plurality of manners, based at least in part on a current activity state of a set of storage devices determined to potentially interfere with operation of the selected data storage device, the plurality of manners including delaying use of the selected data storage device until the storage devices determined to potentially interfere with operation of the selected data storage device are idle, the plurality of manners further including at least one manner that involves reading fewer than all of the plurality of data fragments, and the set of storage devices comprising multiple storage devices and further including preventing use of the selected data storage device if the current activity state indicates a high risk of data loss or corruption; and
perform the operation in accordance with the determined manner.

19. The one or more non-transitory computer-readable storage media of claim 18, wherein the devices are from an array of data storage devices that includes the data storage device.

20. The one or more non-transitory computer-readable storage media of claim 18, wherein the operation includes a read, write or delete operation on the selected data storage device.

21. The one or more non-transitory computer-readable storage media of claim 18, wherein the current activity state is based at least in part on whether one or more devices of the devices determined to potentially interfere with operation of the selected data storage device are active.

22. The one or more non-transitory computer-readable storage media of claim 18, wherein the plurality of manners selecting a different data storage device for performing the operation.

23. The computer-implemented method of claim 1, further comprising:
  determining, based at least in part on a set of data placement rules applied to the current activity states of subsets of the plurality of storage devices, a placement for storing the generated data fragments, the placement indicating the subsets of the plurality of storage devices selected to provide low risk of data loss.

24. The computer-implemented method of claim 6, further comprising determining, based at least in part on a set of data placement rules applied to physical characteristics of a set of data storage devices, a placement for fragments of data, the placement indicating at least the storage medium of the data storage device.

25. The system of claim 11, wherein the instructions further cause the system to determine a placement for fragments of data, the placement indicating at least the particular storage device.

26. The one or more non-transitory computer-readable storage media of claim 18, wherein the instructions further cause the system to determine a placement for fragments of data, the placement indicating at least the data storage device.

* * * * *